United States Patent
Dorrington et al.

(10) Patent No.: US 9,874,638 B2
(45) Date of Patent: Jan. 23, 2018

(54) TIME OF FLIGHT CAMERA SYSTEM WHICH RESOLVES DIRECT AND MULTI-PATH RADIATION COMPONENTS

(71) Applicant: University of Waikato, Hamilton (NZ)

(72) Inventors: Adrian Andrew Dorrington, Auckland (NZ); Refael Zabdi Whyte, Hamilton (NZ)

(73) Assignee: UNIVERSITY OF WAIKATO, Hamilton (NZ)

( * ) Notice: Subject to any disclaimer, the term of this patent is extended or adjusted under 35 U.S.C. 154(b) by 462 days.

(21) Appl. No.: 14/553,047

(22) Filed: Nov. 25, 2014

(65) Prior Publication Data

US 2015/0253429 A1 Sep. 10, 2015

(30) Foreign Application Priority Data

Mar. 6, 2014 (NZ) ........................ 622117
Oct. 23, 2014 (NZ) ........................ 701345

(51) Int. Cl.
*G01S 17/89* (2006.01)
*G01S 7/481* (2006.01)
*G01S 7/493* (2006.01)
*G01S 7/484* (2006.01)

(52) U.S. Cl.
CPC ............ *G01S 17/89* (2013.01); *G01S 7/4815* (2013.01); *G01S 7/493* (2013.01); *G01S 7/484* (2013.01)

(58) Field of Classification Search
CPC ...... G01S 7/4866; G01S 7/4817; G01S 17/89; G01S 17/10
See application file for complete search history.

(56) References Cited

U.S. PATENT DOCUMENTS

2012/0033045 A1* 2/2012 Schweizer ............ G01S 7/4912
 348/46
2013/0088726 A1* 4/2013 Goyal ................... G01S 7/4866
 356/634

OTHER PUBLICATIONS

International Search Report, dated Dec. 3, 2015; Application No. PCT/NZ2015/000012.
Kirmani et al., "Codac: A Comprehensive Depth Acquisition Camera Framework," In: 2012 IEEE Conference on Acoustics, Speech and Signal Processing (ICASSP), Mar. 25-20, 2012, pp. 5425-5428.
Jinwei Gu et al., "Multiplexed Illumination for Scene Recovery in the Presence of Global Illumination", In Computer Vision (ICCV), 2011 IEEE International Conference, pp. 691-698, IEEE, 2011.

(Continued)

*Primary Examiner* — Luke D Ratcliffe
(74) *Attorney, Agent, or Firm* — Young & Thompson

(57) ABSTRACT

A time of flight camera system resolves the direct path component or the multi-path component of modulated radiation reflected from a target. The camera system includes a time of flight transmitter arranged to transmit modulated radiation at a target, and at least one pattern application structure operating between the transmitter and the target, the pattern application structure operating to apply at least one structured light pattern to the modulated transmitter radiation, and an image sensor configured to measure radiation reflected from a target. The time of flight camber is arranged to resolve from the measurements received the contribution of direct source reflection radiation reflected from the target.

30 Claims, 13 Drawing Sheets
(4 of 13 Drawing Sheet(s) Filed in Color)

(56) References Cited

OTHER PUBLICATIONS

Mohit Gupta et al., "A Practical Approach to 3D Scanning in the Presence of Interreflections, Subsurface Scattering and Defocus", International Journal of Computer Vision, pp. 1-24, 2013.
Shree K. Nayar et al., "Fast Separation of Direct and Global Components of a Scene using High Frequency Illumination", ACM Transactions on Graphics (TOG), 25(3), pp. 935-944, 2006.
Kadambi, Achuta et al. "Coded Time of Flight Cameras: Sparse Deconvolution to Address Multipath Interference and Recover Time Profiles"—ACM Trans. Graph. 32 (2013): 167:1-167:10.
Global illumination from Wikipedia, https://en.wikipedia.org/wiki/Global_illumination.

* cited by examiner

TIME OF FLIGHT CAMERA SYSTEM WHICH RESOLVES DIRECT AND MULTI-PATH RADIATION COMPONENTS

BACKGROUND OF THE INVENTION

Field of the Invention

This invention relates to improvements in respect of a time of flight camera system configured to resolve either or both of the direct path and multipath components of radiation received by the system.

Description of the Related Art

Time of flight camera systems are able to resolve distance or depth information from light radiation beams which have been modulated and reflected from a target in a scene. These camera systems calculate a distance measurement from the target based on phase information extracted from the received reflected radiation.

The measurements generated by the sensors of the time of flight camera represent the direct path reflections of a modulated light source, and a multipath component from the contribution of multiple reflections of the same modulated light source from nearby objects. Time-of-flight imaging suffers from a number of effects that are detrimental to imaging quality. Examples include multi-path interference and motion blur.

The direct path radiation is of interest in depth or range measurement applications while in other cases the multipath component provides valuable information as to the current condition of the target. For example PCT patent specification publication WO2012/053908 discloses a tomographic style application for time of flight technology where the multipath component provides subsurface scattering information.

The contribution of the multipath component is unwanted in time of flight depth sensing applications. Prior art implementations of these devices have been unable to resolve depth information from areas of a scene which include corners or other similar reflecting surfaces. This is due to small difference in (optical path length) distance between the direct and multi-path signal returns received.

In applications involving 3D imaging using structured light scanning multi-path interference is also a source of error to be addressed. In these applications structured light patterns are projected on a target, with deformation of the pattern detected by a receiving camera being used to determine the form or surface shape of the target. This may be contrasted with time-of-flight imaging where the phase of received light is used to determine propagation delay and therefore distance information. Therefore, the measurement error caused by multiple propagation paths in structured light depth cameras and time of flight cameras is different. Time of flight cameras measure the phase and amplitude of the returning light, while structured light methods measure the intensity of the light in the scene.

A number of publications have been made in the 3D imaging field which aim to reduce the error effects of multipath interference. An example of such an approach is published by Shree K Nayar, Gurunandan Krishnan, Michael D Grossberg, and Ramesh Raskar, entitled "Fast separation of direct and global components of a scene using high frequency illumination" ACM Transactions on Graphics (TOG), 25(3):935-944, 2006. In this publication a fast method of separating global and direct light returns is proposed by projecting structured light patterns at a target, with each pattern varying the illumination experienced by each area of the target which is assessed by a pixel of the receiving cameras system. The information gathered by this approach employs spatial variation in the projected patterns to isolate direct path returns for each pixel of the camera.

A further publication related specifically to time-of-flight camera systems and the mitigation of multipath error effects is provided by published US patent application US 2014/0055771 to Oggier. However, although targeted at a time-of-flight camera application, the structured light transmission system disclosed operates to scan only an isolated target of interest within the entire field of view of the camera. The end result of this approach is to multiply the direct path returns received by the camera, making multipath returns a lower relative proportion of the received signal. Although an improvement over the prior art, this approach does not calculate or isolate the direct path component of a received camera signal, simply providing an error reduction effect.

One aspect of these techniques and technologies is the projection of a patterned illumination, as opposed to the traditional homogeneous illumination field. Typically a Digital Micromirror Device (DMD), also known as a Micromirror Array or Digital Light Projector device is used to generate the pattern. DMDs have the disadvantages of large size, large power consumption, and complicated controlling image generation electronics are required. Another significant drawback is inefficiency, as the light not being projected is wasted. However, they have the advantage that one device can generate the multiple patterns needed for many of the techniques and technologies.

It would therefore be of advantage to have improvements over and above prior art time of flight camera systems which address any or all of the above issues. In particular improvements to a time of flight camera system which allowed for the resolution of either or both direct path and multipath radiation contributions in the signals received by the camera system would be of advantage.

SUMMARY OF THE INVENTION

According to one aspect of the invention there is provided a time of flight camera system arranged to resolve the direct path component or the multi-path component of modulated radiation reflected from a target, the camera system including a time of flight transmitter arranged to transmit modulated radiation at a target, and at least one pattern application structure operating between the transmitter and the target, the pattern application structure operating to apply at least one structured light pattern to the modulated transmitter radiation, and an image sensor configured to measure radiation reflected from a target, the time of flight camera being arranged to resolve from the measurements received the contribution of direct source reflection radiation reflected from the target.

According to a further aspect of the invention there is provided a time of flight camera system arranged to resolve the direct path component or the multi-path component of modulated radiation reflected from a target, the camera system including a time of flight transmitter arranged to transmit modulated radiation at a target, and at least one pattern application structure operating between the transmitter and the target, the pattern application structure operating to apply at least one structured light pattern to the modulated transmitter radiation, and an image sensor configured to measure radiation reflected from a target, and a processor arranged to receive the image sensor measurements and being programmed to resolve from the measurements received the direct source reflection radiation, the multi-path component radiation, and/or the relative contributions of direct and multi-path radiation.

Preferably at least one pattern application structure is arranged to apply an initial pattern and the inverse form of the same initial pattern.

Preferably the inverse form of the same initial pattern is applied with modulated radiation which is phase shifted from the modulated radiation used to apply the initial pattern.

Preferably the inverse form of same initial pattern is applied with modulated radiation which is 180 degree phase shift from the modulated radiation used to apply the initial pattern.

According to a further aspect of the invention there is provided a method of resolving the direct path component or the multi-path component of modulated radiation reflected from a target by a time of flight camera system, including the steps of:

illuminating a target to be imaged with a modulated light beam which encodes a first structured light pattern, capturing a first image of the illuminated target with an image capture device, the image captured defining a pixel surface made up from a plurality of pixels, illuminating a target to be imaged with a plurality of modulated light beams which encode different structured light patterns, capturing further images of the target illuminated by a series of different encodings of structured light patterns, calculating the contribution of direct source reflection radiation or the contribution of multi-path component radiation.

In some embodiments the target is illuminated at the same time with modulated light beams which encode different structured light patterns, each of said modulated light beams having a structured light pattern encoded with a different orthogonal coding.

In some embodiments the target is illuminated at different times with modulated light beams which encode different structured light patterns.

Preferably a further image of the target is captured of the target illuminated with the inverse form of the first structured light pattern, the inverse form of first structured light pattern being applied with modulated radiation which is phase shifted from the modulated radiation used to apply the first structured light pattern.

Preferably a 180 degree phase shifted modulation radiation is used to apply the inverse form of the first structured light pattern.

Preferably the contribution of direct source reflection radiation is calculated by adding the images values measured for an applied structured light pattern to the image values measured for the inverse form of the same applied structured light pattern.

According to yet another aspect of the invention there is provided a non-transitory computer-readable medium encoded with a computer program code for time of flight range imaging, the program code including instructions for causing a modulated illumination signal to be emitted;

causing at least one pattern application structure to apply a plurality of structured light patterns to the modulated illumination signal;

causing an image sensor to capture a plurality of images of reflections of the modulated illumination signal for a plurality of pixels of the image sensor resolving the contribution of direct source reflection radiation and/or the contribution of multi-path component radiation from the captured images at each of the plurality of pixels.

Preferably the code causes an image of the target illuminated by first structured light pattern and by the inverse form of the first structured light pattern to be captured.

Preferably the code causes the inverse form of first structured light pattern to be applied with a modulated illumination signal which is phase shifted from the modulated illumination signal used to apply the first structured light pattern. In a further preferred embodiment the modulated illumination signal is phase shifted by is 180 degrees.

Preferably the contribution of direct source reflection radiation is calculated by adding the images values measured for an applied structured light pattern to the image values measured for the inverse form of the same applied structured light pattern.

According to a further aspect of the invention there is provided a processor-readable medium having stored thereon processor-executable instructions which when executed by a processor perform a method substantially as described above.

The present invention provides improvements in respect of the field of time of flight range imaging camera systems. The information or images provided by these devices encode distance to target information in each pixel of the images they generate. This distance information is derived from the phase of the received light. The present invention improves on existing time of flight camera technology by resolving or calculating the contribution of direct path light returns, or multipath light returns, or both direct and multipath light returns in the reflected light measurements made by the camera. Those skilled in the art will appreciate that various applications of time of flight camera technology may employ either or both and multipath return information to remove measurement errors or provide information about the make up of a target within a scene being imaged.

Those skilled in the art will appreciate that the invention can be applied to a variety of time of flight range imaging camera system implementations. For the sake of simplicity reference will primarily be made throughout this specification to a time of flight camera system implementing the invention using modulated radiation or light beams where the phase of the light is shifted periodically. However those skilled in the art will appreciate that other approaches—such as for example pulsed light, pseudo-random or frequency modulated continuous wave based time of flight cameras—may also employ or implement the invention in various embodiments.

The approach provided by the invention relies on the application of structured light patterns to a target within the scene of interest, and preferably to the entire scene imaged by the pixels of the camera system. The structured light patterns applied by the invention are encoded within the modulated light or radiation normally transmitted by an existing prior art time of flight camera system.

The structured light patterns employed by the invention vary the intensity or phase, or code, or other aspects of the modulated light falling on and reflected by at least a portion of the scene to be imaged. Preferably relatively high spatial frequency patterns are encoded by the invention, where each pattern applied therefore exhibits spatial variation between component pixels making up the pattern.

The different patterns encoded by the invention change in a predefined manner the radiance of direct path reflections received by a particular pixel. This approach allows the results obtained from different patterns to be compared to calculate both the direct and multipath components of light received for each pixel.

Preferably the time of flight transmitter illuminates at least 50% of the scene containing the target. In a further preferred embodiment the time of flight transmitter illuminates substantially all of the scene containing the target. Those skilled in the art will appreciate that increasing the amount of a scene which is illuminated with the encoded structured light pattern will increase the accuracy of the direct and multipath resolution calculations performed in accordance with the invention.

As referenced above the invention includes or provides at least one pattern application structure. A pattern application structure as utilised in accordance with the present invention may be provided by any component or apparatus arranged to apply a structured light pattern to the modulated light transmitted by a time of flight camera system. In various embodiments a pattern application structure may be implemented by the same components used to generate the modulated light used by a time of flight camera, or alternatively may be formed by a separate component positioned between the modulated light transmitted and a scene to be imaged.

In some embodiments at least one pattern application structure is formed by at least one engineered diffuser.

In other embodiments at least one pattern application structure is formed by a micro-mirror array projector.

In various embodiments the effect of at least one pattern application structure is combined with at least one source modulation frequency in the radiation used to illuminate at least a portion of a scene of interest. In particular the pattern application structure operates on the modulated transmitter radiation, resulting in at least a portion of a scene of interest being illuminated by radiation defining the structured light pattern where this radiation is also modulated by a source modulation frequency.

Preferably at least one pattern application structure is arranged to apply a plurality of structured light patterns to the modulated transmitter radiation, said plurality of structured light patterns being generated using an initial pattern. In such embodiments an initial pattern—preferably which exhibits a high degree of spatial variation—can be applied initially by a pattern application structure. Further patterns can then be generated and applied by modulating the brightness of each pixel of the pattern with, for example, a similar type of waveform as that used to modulate the transmitter radiation.

For example in some embodiments the phase of the projected pattern can be changed at three times the rate of the phase offset of the radiation modulation frequency. If considering only one pixel in the scene, this pixel is changing brightness over time due to both the change of phase of the source modulation, and because of the changes made to the pattern being applied. These two effects operate at different frequencies, allowing for decoding of information from the source modulation and the moving pattern independently.

Preferably the waveform used to modulate the transmitter radiation and generate a structured light pattern are derived from the same basis function allowing the direct source reflection radiation and the multi-path component radiation to be decoded into orthogonal mathematical spaces.

For example when using the exemplary common waveform method referenced above, the direct and global paths are separated into different frequencies, which are orthogonal on the Fourier basis. However those skilled in the art will appreciate the possibility of separating the returns into vectors that are orthogonal on another basis. In various additional embodiments separation may be achieved—for example—by the application of different pseudo-random codes.

Reference throughout this specification will in general be made to the invention applying further patterns generated by completing an operation on an initial pattern using a similar type of waveform to that used to modulate the transmitter radiation. However those skill in the art will appreciate that a range of different pattern transformation operations may be used in alternative embodiments of the invention.

Preferably a sinusoidal basis function is used, and a sinusoidal or square waveform is used to modulate the transmitter radiation and generate the structured light pattern applied to the transmitter radiation.

In some embodiments the transmitted radiation is encoded with a different pseudo-random sequence, Walsh-Hadamard code or equivalent, in time for each projected pattern. Those skilled in the art will appreciate that a variety of techniques may be employed to generate the structured light patterns used by the invention.

In some embodiments the invention is arranged to encode a number of different patterns over a time interval where the patterns applied vary with time. In this way the results required by the invention can be obtained over the course of this time interval. For example, in such embodiments a pattern application structure may be configured to encode a pattern made up by a plurality of pixels where the value of the pattern encoded on at least one pixel varies to encode a different pattern over time.

In some embodiments a single pixel is encoded with a pattern value which varies over time in accordance with the waveform derived from the same basis function as that used to modulate the transmitter illumination signal.

In some embodiments an initial pattern is translated spatially and applied as a different pattern to the modulated radiation. In these embodiments an initial pattern may be translated into vertically, horizontally or both vertically and horizontally to form a new pattern which exhibits spatial variation appeared with the initial pattern.

In a further embodiment the invention may apply one selected pattern, and also the inverse of the selected pattern. In such embodiments the phase of the transmitted radiation can be shifted between the application of the selected pattern and its inverse form.

For example in one potential embodiment, the selected pattern can be applied with modulated radiation, and the inverse of the pattern can be applied with the same form of modulated radiation which has been phase shifted by 180 degrees.

References to inverted patterns throughout this specification will be understood by those skilled in the art to be patterns generated by taking the mid-point of the initial range of intensity values used to encode a pattern and generating the new pattern by reflecting these vales about the midpoint intensity. Areas of the pattern with the maximum or minimum light intensity will therefore experience the most change, being inverted to present the minimum available light intensity, and vice versa, the maximum light intensity in the inverted pattern.

This inversion of the selected pattern and the phase shifting of the modulated radiation used to apply it allows for a simplified method of direct contribution calculation through the addition of the two sets of measured pixel values. As the global illumination contributions present in each of the pair of measurements are the same, the inversion of the pattern and phase shift of the illuminating radiation in the second set of pixel measurements acts to cancel out the global or multipath contribution from the result of the summation—leaving only a direct source reflected radiation measurement. Those skilled in the art will also appreciate that the isolation of the direct source measurement can in turn be used to determine the multipath radiation component as required by the particular application in which the invention is employed.

In a further preferred embodiment the selected pattern may be applied in both its initial and inverted forms, and then modified to a new form and applied again in both modified and inverted modified forms. Those skilled in the art will appreciate that any one or combination of the pattern modification techniques referenced above may be used to generate subsequent modified patterns which may be applied in both their original and inverted forms. Furthermore, yet additional pattern modification steps may be completed in various embodiments to apply a sequence of different patterns and their inverted forms with phase inverted illumination radiation.

In yet further embodiments the invention may apply a set of patterns which in combination illuminate the target scene of a time of flight camera system, where each pattern of the set is applied with modulated radiation having a specific phase offset which is distinct from the phase offset of the modulated radiation used to apply the other member patterns of the set. The patterns of this set can each illuminate selected distinct areas only of a target scene so that the net effect of the application of the set of patterns is to illuminate the entire target scene once only. As each pattern of the set can be applied with it's own specific phase offset this allows for the simultaneous applications the patterns while still allowing the reflections of each pattern to be resolved independently. As discussed above with respect to the application of inverse patterns, again the direct path contribution can be isolated for each selected distinct area by simple arithmetic operations to remove the multipath contributions common to the reflections from this area.

Those skilled in the art will appreciate that the references made above to the phase offset used in the application of each pattern of a set is independent of any implementation of a time of flight camera system which also applies a phase shift to the modulated radiation it transmits. In such embodiments the phase offset referenced would be added to the phase shift normally completed in the standard operation of these forms of time of flight camera systems.

In some embodiments the invention can include two or more pattern application structures, each of which encodes one of a plurality of structured light patterns in the modulated illumination signal, the pattern applied by a pattern application structure using a different orthogonal coding to that used by another pattern application structure.

In such embodiments a plurality of pattern application structures can be used to simultaneously encode different structured light patterns, or a different modulation pseudo-random code for each pattern (or some similar orthogonal encoding) or a combination of these approaches on the light illuminating a scene to be imaged. This approach may therefore increase the speed of operation of the resulting time of flight camera, eliminating any delays inherent in the encoding of different structured light patterns over a time interval by a single pattern application structure.

Those skilled in the art will appreciate that the use of simultaneous structured light patterns requires that each individual pattern be distinguishable from the other patterns applied. In these embodiments the transmitted radiation may have a different modulation frequency for each projected pattern, and/or a different modulation phase step sequence for each projected pattern.

In a further preferred embodiment both the initial and inverted forms of a structured light pattern may be applied at the same time by a time of flight camera system. Both these patterns may be applied simultaneously to simplify image processing techniques used to isolate the direct and multipath components within the image. As a pattern and its inverse form can be applied simultaneously using phase shifted illuminating radiation, the summation operation required to isolate the direct path contribution can be completed within the image integration process of an image sensor. The resulting image will therefore provide information relating to only the direct path contribution without requiring the use of a processor to run an image processing addition operation.

Similarly, in embodiments where a set of patterns in combination illuminate a target with radiation with distinct phase offset values, the patterns of the set may again be applied at the same time. Again the simultaneous application of this set of patterns allows the direct path isolation summation to be completed within the image integration process of an image sensor.

Reference in general throughout this specification is also made to the invention including or requiring a processor in various embodiments. However as indicated above in some instances at least the direct path component of radiation reflected from a target may be isolated using hardware components other than a processor. Those skilled in the art will appreciate that a processor may be employed in various embodiments as required to resolve from the measurements received any combination of the direct source reflection radiation, the multi-path component radiation, and/or the relative contributions of direct and multi-path radiation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
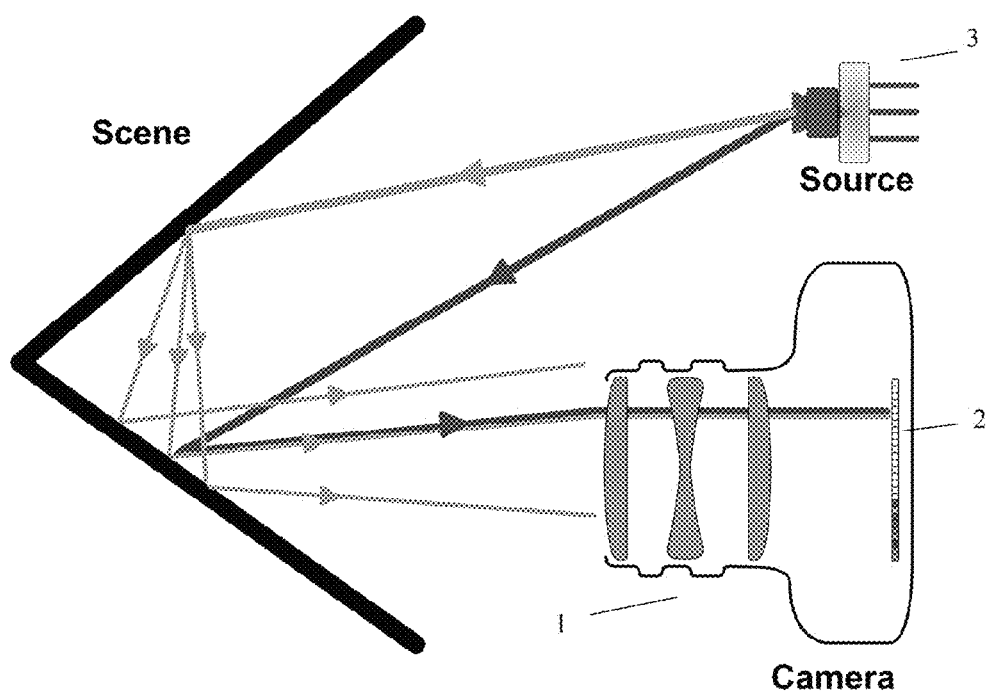
FIG. 1 shows one example implementation of the invention with a time of flight camera system and how the measured signal of one pixel is due to the direct illumination from the source and the global illumination.

Additional and further aspects of the present invention will be apparent to the reader from the following description of embodiments which is given by way of example only.

DETAILED DESCRIPTION OF THE EMBODIMENTS

Time of flight cameras illuminate a scene with amplitude modulated light and measure the phase change between the outgoing and reflected modulation envelope. The distance the light has traveled is encoded in the phase change in the modulation envelope. Time of flight cameras suffer measurement errors caused by multi-path propagation paths from the light source back to the same pixel. One of the causes is inter-reflections in the scene.

The embodiments of the invention discussed below provide a technique used to recover the complex direct and multipath components of the scene.

Multipath in Time of Flight range cameras causes measurement errors that are scene dependent. Multipath occurs when there are multiple propagation paths from the light source to the pixel. The measured phase and amplitude value is the combination of both paths on the complex plane.

For example, documentation provided in relation to the SR4000 Time of Flight camera by Mesa Imaging states that using the camera to image a corner will result in wrong measurements due to multipath.

The light reflected from a scene imaged by a Time of Flight camera can be expressed as $$s(t) = \alpha \cos(\omega_2 t - \varphi) + b \qquad (1)$$

Where a is the amplitude of the returning light, $\omega_1$ encodes the modulation frequency, $\varphi$ is the phase offset due to the distance traveled and b is the background light. To extract out the phase the reflected light is correlated by a reference signal g(t).

$$g(t) = \cos(\omega_2 t) \qquad (2)$$

The measured correlation waveform from each pixel in time of flight imaging is the correlation of the above two equations $$h(\tau) = (s \otimes g)(t) = \frac{1}{T} \lim_{T \to \infty} \int_{-\frac{T}{2}}^{\frac{T}{2}} s(t) g(t+\tau) dt \qquad (3)$$

When the integral in this equation is evaluated the correlation waveform is $$h(\tau) = \frac{a}{2} \cos(\omega_i \tau + \phi) + b \qquad (4)$$

Where τ is the phase of the reference waveform g(t). By phase shifting the reference waveform multiple measurements of the correlation waveform can be made and the unknown measurements estimated. A minimum of three measurements is necessary, typically four are used. The relationship between the measured phase and distance d is $$d = \frac{c\phi}{2\omega_l} \qquad (5)$$

Where c is the speed of light. The multipath problem can be expressed as the sum of the complex exponentials as the phase and amplitude are a vector on the complex plane. With N returns it is expressed as $$\zeta - \sum_{k=1}^{N} a_k \exp(-j\phi_k) \qquad (6)$$

When two sinusoidal waves at the same frequency but different amplitudes and phases add together the resulting function is another sinusoidal wave with a new phase and amplitude. Separation is impossible from one measurement because the correlation waveforms of each of the two returns have the same frequency as each other.

The purpose of the invention's direct and global component separation is to decompose the measured radiance, L, at each pixel into a direct component $L_d$ and a global component $L_g$.

$$L = L_d + L_g \qquad (7)$$

It is assumed that the global function at each point is smooth compared to the illumination frequency. This means that the global component can not be caused by specular reflections.

The scene is illuminated with a high frequency checkerboard pattern so that half the scene is black and the other half white. In the illuminated pixels (the white ones) the measured signal is $$L_{max} = L_d + \frac{1}{2} L_g \qquad (8)$$

If the scene is then illuminated with the inverse checkerboard pattern the dark pixels will measure $$L_{min} = \frac{1}{2} L_g \qquad (9)$$

This set of two equations has two unknown variables therefore the unknowns can be solved for. However in practice where projectors are used with the invention to project structured light patterns, these devices have bleeding about the edges and the projector coordinates do not match the camera's. This means on the edges of the squares the results will be incorrect. One solution is to capture more images by phase shifting the position of the checker board in the x and y dimension. The direct and global components can be calculated by $$L_g = 2L_{min} \qquad (10)$$

$$L_d = L_{max} - L_{min} \qquad (11)$$

There is the potential to shift the checker board pattern multiple times—for example 25 times made up of five shifts in the x direction for each five shifts in y.

It is possible to resolve the direct and global components with three frames. By illuminating the scene with a high frequency pattern such as $$P(n, m) = \sin\left(\frac{(2\pi n)}{k} + v + \sin\left(\frac{2\pi m}{l}\right)\right) \qquad (12)$$

Where P is the projected image, n and m are the projector coordinates, and v is the phase shift of the pattern in pixels per frame in the x dimension. The variables k and l change the frequency of the pattern in the x and y direction respectively. The light source has a maximum amplitude A, and the projected sinusoidal pattern has a frequency f cycles/pixel. The value over each phase step over time can be written as $$L(t) = \frac{A(1 + \sin(\omega_p t + \theta))}{2} \qquad (13)$$

Where $\omega_p = 2\pi f v$ is the modulation frequency of the projected pattern. If each point of the scene has a reflectance R then the returning light at each camera pixel is expressed as $$I(t) = RL(t) = \frac{L_d}{2}\sin(\omega_p t + \theta) + \frac{L_d + L_g}{2} \qquad (14)$$

This can be rearranged to be $$I(t) = \alpha\sin(\omega_p t) + \beta\cos(\omega_p t) + \frac{1}{\sqrt{2}}\gamma \qquad (15)$$

$$\alpha = \frac{L_d\cos(\theta)}{2} \qquad (16)$$

$$\beta = \frac{L_d\sin(\theta)}{2} \qquad (17)$$

$$\gamma = \frac{(L_g + L_d)}{\sqrt{2}} \qquad (18)$$

The unknowns α, β, γ can be extracted by taking the Fourier transform over t. The direct and global components can be calculated by $$L_d = 2\sqrt{\alpha^2 + \beta^2} \qquad (19)$$

$$L_g = \sqrt{2}\gamma L_d \qquad (20)$$

The multipath problem from equation 6 can be rewritten in terms of the direct and global components $$\zeta = a_d \exp(-j\varphi_d) + a_g \exp(-\varphi_g) \qquad (21)$$

Where a d and φ d is the amplitude and phase of the direct component respectively, and a g and φ g is the amplitude and phase of the global component. For the purposes of this explanation, it is assumed that there is one direct return which is the shortest return from the light source to the pixel and a global return which includes all other returns.

When using a high frequency checkerboard pattern as the illumination source equations 8 to 11 can still be used with complex components if certain assumptions are made. The maximum and minimum values are estimated by $$L_{maxest} \approx \max|L(t)| \qquad (22)$$

$$L_{minest} \approx \min|L(t)| \qquad (23)$$

The maximum and minimum complex value can be found by finding the minimum and maximum of the absolution value. It is believed that these assumptions are valid so long as $$|L_g + L_d| > |L_g| \qquad (24)$$

Which leads onto $$|L_g| << |L_d| \qquad (25)$$

Or this constraint has to be met.

$$\phi_g - \phi_d \leq \frac{\pi}{2} \qquad (26)$$

The physical interruption of these constraints is when the returns are summed together on the complex plane the resulting measurement is a vector. If the direct and global components have similar amplitudes then the measured amplitude could in fact be smaller than the global amplitude therefore equation 23 would be invalid. The second constraint arises when the returns are of similar amplitude and the phase difference between the returns is less than 90 degrees then the resulting amplitude of the measured vector will always be larger than the amplitude of the global therefor equation 22 will still be true.

With the additional two constraints this limits the applicable situations that this method of direct global separation can be used with Time of Flight imaging. Separation with no constraints and the minimum number of frames is desired. The general form can be expressed as the combination of equation 14 and equation 4. This leads to $$I(t, \tau) = \frac{h_d(\tau)}{2}L(t) + \frac{h_g(\tau)}{2} \qquad (27)$$

Where $h_d$ and $h_g$ is the correlation waveform for the direct and global components and L(t) is the projected pattern with time. It is desired to find a function L(t) that minimizes the number of samples required to separate out the components while maintaining results in the presence of noise and ideally no additional constraints would be placed on the unknown variables. This can be thought of as encoding the amplitude in time while with previous work the frequency was changed with time. Using multiple modulation frequencies can be included in the above equation, the resulting equations become:

$$\phi(\omega_t) = \frac{2\omega_t d}{c} \qquad (28)$$

-continued $$h(\tau, \omega_l) = \frac{a}{2}\cos(\omega_l\tau + \phi(\omega_l)) \quad (29)$$

$$I(t, \tau, \omega_l) = \frac{h_d(\tau, \omega_l)}{2}L(t) + \frac{h_g(\tau, \omega_l)}{2} \quad (30)$$

A function L(t) that makes the makes the inverse problem well conditioned is desired. If the function L(t) is defined as a cosine wave and its frequency such that $$L(t) = \frac{1 + \cos(\omega_p t - \theta)}{2} \quad (31)$$

$$\omega_p t = l\omega_l\tau \quad (32)$$

$$I(\tau) = \frac{a_d}{4}(\cos((l-1)\omega_l\tau + \theta - \phi_d) + \cos((l+1)\omega_l\tau + \theta + \phi_d)) + \quad (33)$$
$$\frac{a_d\cos(\omega_l\tau + \phi_d) + a_g\cos(\omega_l\tau + \phi_g)}{2}$$

A value for l is desired such that the problem is invertible in the fewest samples of $\tau$. The table below shows for integer values of l if the problem is solvable using Fourier analysis and how many samples are required.

| l | Solvable | Samples |
|---|---|---|
| 0 | No | — |
| 1 | No | — |
| 2 | No | — |
| 3 | Yes | 8 |
| 4 | Yes | 10 |
| 5 | Yes | 12 |

This table provides a summary of solvability of equation 33 using Fourier analysis for different values of l. The number of samples is calculated by the Nyquist frequency.

The value of l that makes the system solvable using Fourier analysis with the minimum number of samples is l=3. For $\alpha_k$ and $\varphi_k$ being the amplitude and phase at the k th frequency and l≥3 then $$\theta = \frac{\varphi_{l-1} + \varphi_{l+1}}{2} \quad (34)$$

$$\phi_d = \frac{\varphi_{l+1} - \varphi_{l-1}}{2} \quad (35)$$

$$a_d = 2(\alpha_{l-1} + \alpha_{l+1}) \quad (36)$$

$$\frac{a_\sigma}{2}\exp(-j\phi_g) = \alpha_1\exp(-j\varphi_1) - \frac{a_d}{2}\exp(-j\phi_d) \quad (37)$$

There are no additional constraints on the direct and global components, only the already existing constraint that the global component has a much less spatial frequency than the direct component.

However, the previous analysis for resolving the direct global separation was naive as it ignored the reality that the correlation function is a triangle wave therefore has higher order odd harmonics. The addition of the odd harmonics has the following affect $$h(\tau) = \sum_{n=1,3,5,\ldots}^{N} \frac{a}{2n^2}\cos(n\omega_l\tau + n\phi) \quad (38)$$

$$I(\tau) = \left[\sum_{n=1,3,5,\ldots}^{N} \frac{a}{2n^2}\cos(n\omega_l\tau + n\phi)\right]\cos(l\omega_l - \theta) + \frac{h_g(\tau) + h_d(\tau)}{2} \quad (39)$$

$$I(\tau) = \left[\sum_{n=1,3,5,\ldots}^{N} \left(\frac{a_d}{4n^2}\cos((n+l)\omega_l\tau + n\phi_d - \theta) + \frac{a_d}{4n^2}\cos((n-l)\omega_l - n\phi_d - \theta)\right)\right] + \frac{h_g(\tau) + h_d(\tau)}{2} \quad (40)$$

In the case where l=3 then the third harmonic is multiplied onto the DC and the sixth harmonic. In the case where nine samples are used the sixth harmonic is aliased onto the third harmonic which is not used to compute the direct component. However the fifth harmonic is mixed onto the second and eighth harmonics. The eighth harmonic is aliased onto the first harmonic. This causes errors in the direct and global computation. The presence of the third harmonic does not cause problems however the fifth one does.

It should also be noted that each measurement of the correlation function contains the true measurement and noise. In time of flight cameras this consists of photon shot noise, dark noise, ADC quantization and jitter. It is assumed that all these noise sources are additive white noise and is independent between samples. If these conditions are met then the scaled covariance matrix C is $$C = \frac{2}{N}\sigma_{h_\tau}^2 I \quad (41)$$

Where N is the number of samples, I is the identity matrix and $\sigma^2_{CT}$ is the variance of the additive white noise. In the current case we are making N samples on the correlation function $c_T$. Assuming the real and imaginary components are independent then it can be shown that the variance of the amplitude a and phase $\varphi$ for each frequency bin is $$\sigma_a^2 = \frac{1}{N}\sigma_{h_\tau}^2 \quad (42)$$

$$\sigma_\phi^2 = \frac{2}{Na^2}\sigma_{h_\tau}^2 \quad (43)$$

This is the general case for N samples for four samples. The increase in variance increase in the direct phase and amplitude estimation from the standard time of flight measurement is calculated as $a_t$ and $\varphi_d$ for the phase. Given the assumption that $$\alpha_{l-1} = \alpha_{l+1} \approx \frac{a_t}{4} \quad (44)$$

Then the variance compared to the total can be computed as $$\sigma_{a_d}^2 = \frac{8}{N}\sigma_{h_\tau}^2 \quad (45)$$

-continued $$\sigma^2_{\phi_d} = \frac{16}{Na_t^2} \sigma^2_{h_\tau} \quad (46)$$

This shows that the variance of the direct phase and amplitude estimation increases by eight times compared to using the standard time of flight technique. The variance in the global component will be greater because the global is calculated from the direct.

FIG. 1 shows an exemplary Time-of-Flight range camera 1 built around a PMD19k3 sensor 2 which contains a 120 by 160 pixel array. A DLP LightCrafter projector 3 was modified to illuminate a scene with the desired structured light patterns referenced above. The LEDs from the projector was been removed and the red LED was replaced with a HL6545MG 660 nm120 mW laser diode. The laser diode was controlled by the camera and modulated at 30 MHz. The projector was calibrated to have a linear amplitude response.

FIG. 1 also shows a number of light ray representations illustrating how the measured signal of one pixel is due to the direct illumination from the source and the global or multipath illumination. The multipath illumination can be caused by subsurface scattering, volumetric scattering and translucency.

Resolving multi path in a corner was demonstrated with the embodiment of the invention shown with respect to FIG. 1. The corner used was constructed out of white foam board. The surface finish is lambertian. This means that the amplitude constraint is met and the direct return will always be brighter than the global return. As the corner tested is less than 50 cm which is much smaller than ¼ of a wavelength at 30 Mhz the phase constrain is also met. This makes the corner an ideal test case. The ground truth of the corner is measured by line scanning with the projector when each side of the corner is removed.

Figure 2:
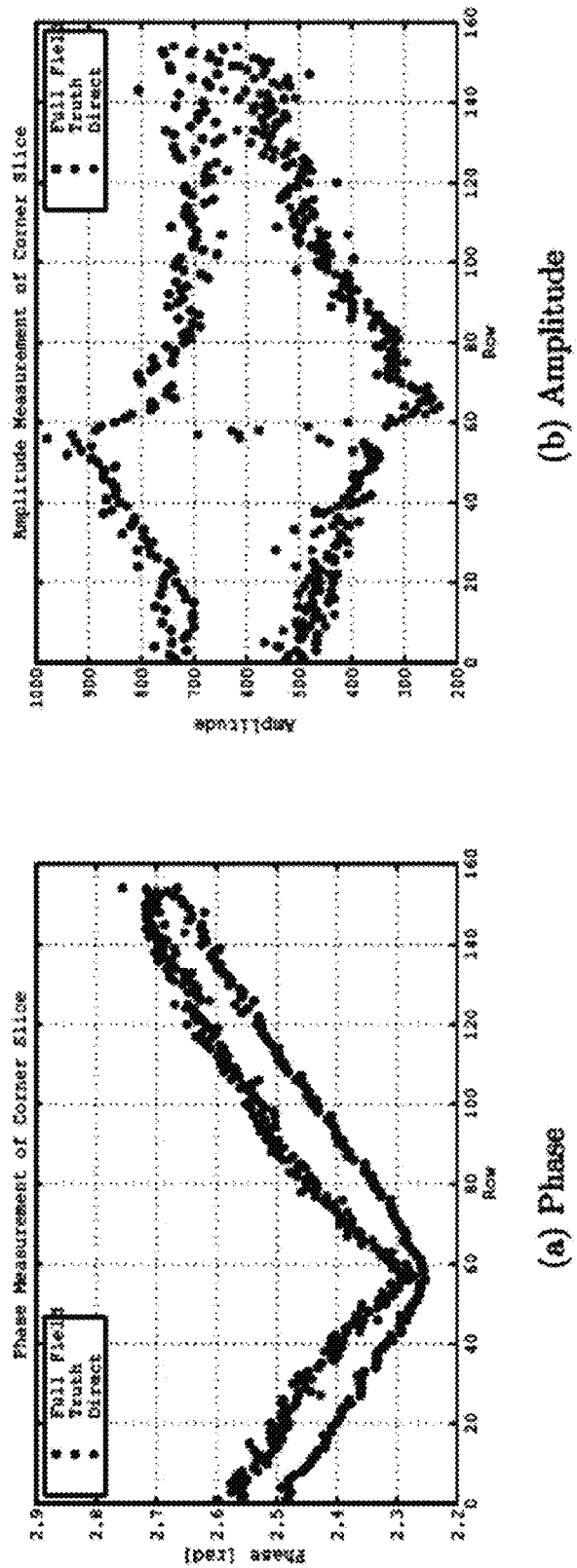
FIG. 2 shows a comparison of measured phase and amplitude when using a standard time of flight camera and the reconstructed direct component compared to the ground truth illustrating direct global separation to successfully resolve multipath in a corner.

FIG. 2a compares the measured phase of one row in the corner when using full-field illumination, the recovered direct phase component and the ground truth phase measurement. The direct component is consistent with the ground truth. The ground truth measurement is curved because the lens distortion is not calibrated.

Figure 3:
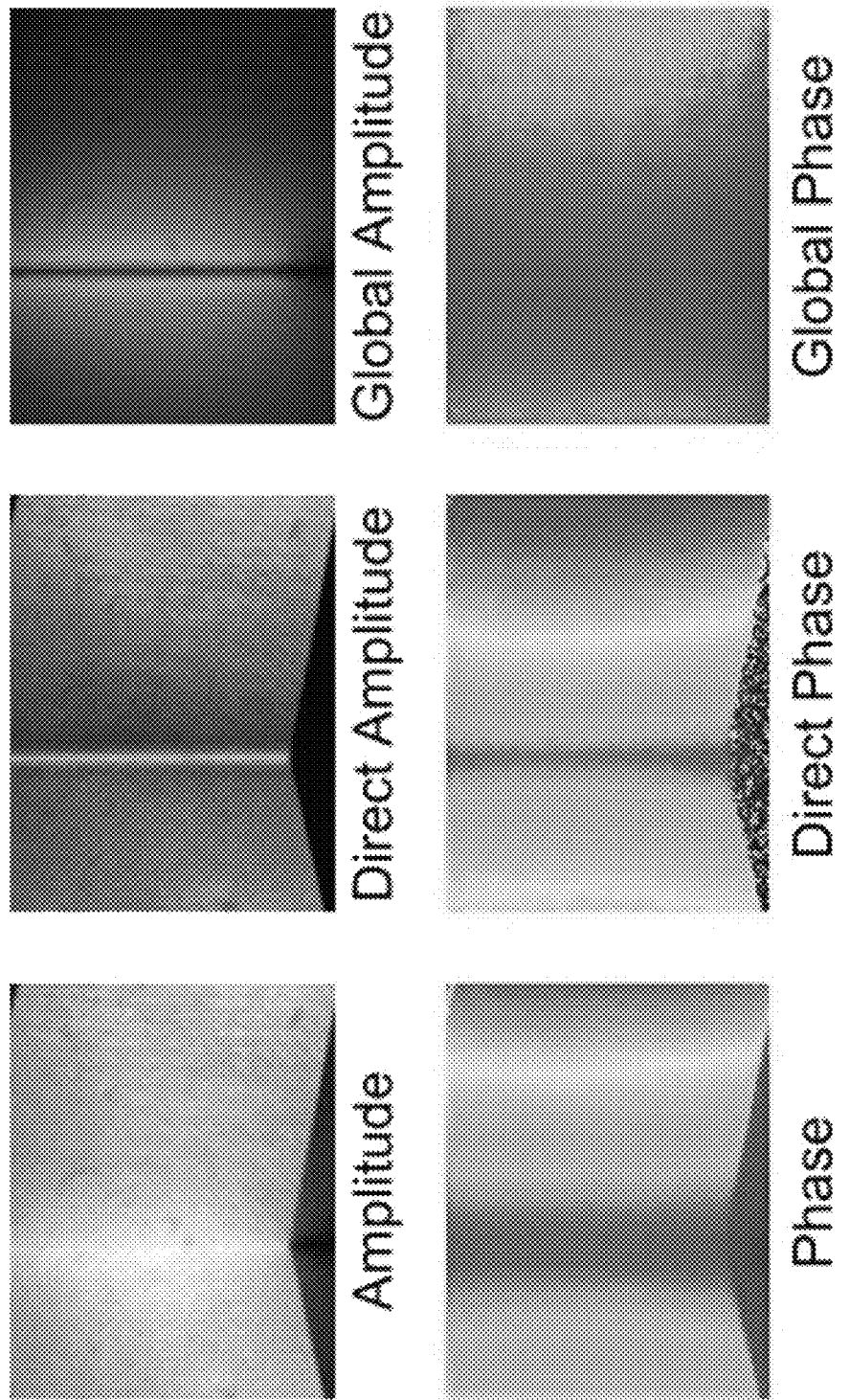
FIG. 3 shows how the measured phase and amplitude of the corner is broken into its direct and global components.

FIG. 2b compares the measured amplitude of one row in the corner when using full-field illumination. The results over the entire image of the corner are shown in FIG. 3. The projector field of view does not match the cameras field of view. Therefore the bottom part of the corner is not directly illuminated. Since there is no direct illumination the measured direct phase is noisy since it should not exist. A simple filter on the phase image based a static threshold of the amplitude would remove the noisy phase pixels.

Figure 4:
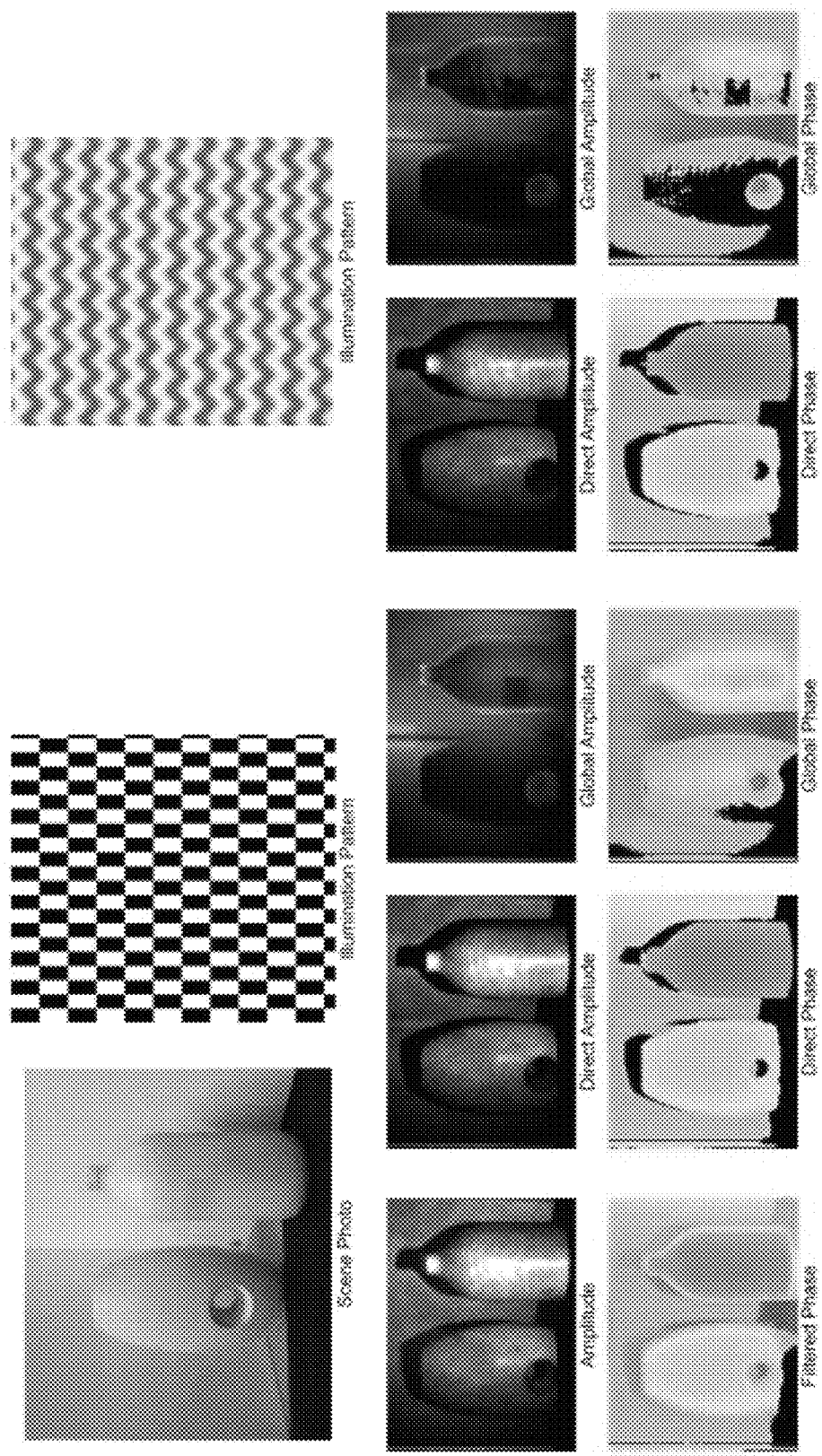
FIG. 4 shows a comparison between direct and global separation when using different illumination patterns. The checker board pattern is phase shifted 25 times, at each phase shift the phase and amplitude is computed. For the sinusoidal pattern a total of 9 phase shifts are taken.

The results from using the optimized illumination pattern is shown in FIG. 4. The multi path in a complex scene is resolved in 9 raw frames. This is compared to the square grid which requires 3 raw frames per phase frame and needs 25 phase frames for a total of 75 raw frames. The phase image is filtered based on the amplitude. The phase on pixels with amplitude below the threshold are removed. Since the light source and camera are not collocated there are shadows from the bottle and vase onto the back wall. Since it is a shadow there is no direct return from those pixels. The computation of the global component depends on the direct global. Therefore errors in the direct computation are introduced to the global component.

Figure 5A:
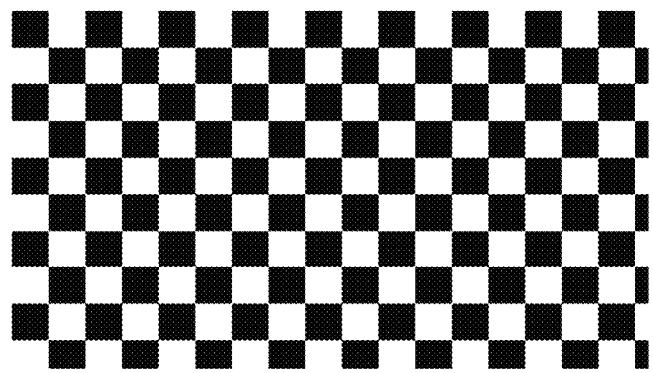
FIGS. 5a, 5b and 5c show example structured light patterns acceptable for use with various embodiments of the invention.
Figure 5B:
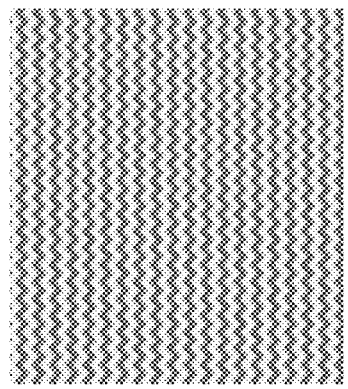
Figure 5C:
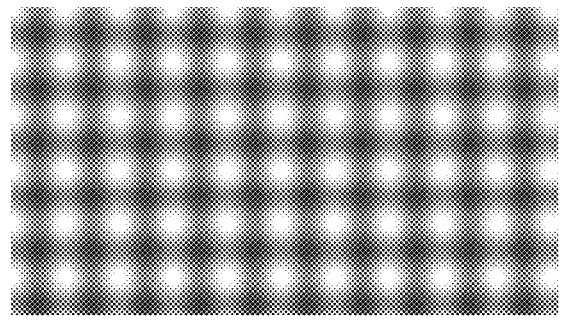

FIGS. 5a, 5b and 5c show example structured light patterns acceptable for use with various embodiments of the invention. In particular, FIG. 5a shows a checkerboard pattern with sharp contrast transitions between squares, FIG. 5b shows a Sine wave form pattern, and FIG. 5c shows a pattern with a Gaussian profile. As can be seen from these figures the patterns used exhibit a high degree of spatial variation.

Figure 6:
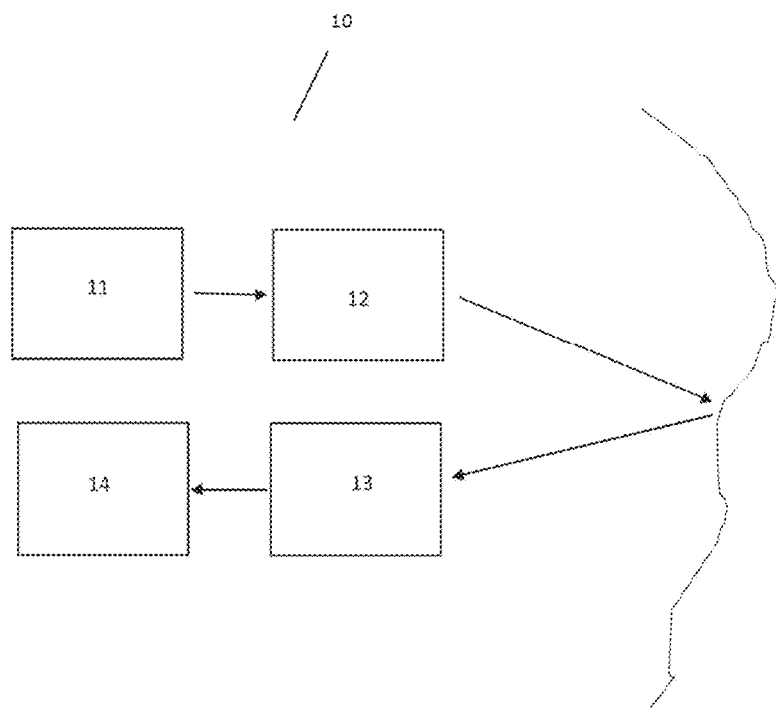
FIG. 6 shows a block schematic diagram of the components of a time of flight camera system implemented in accordance with a further embodiment of the invention.

FIG. 6 shows a block schematic diagram of the components of a time of flight camera system implemented in accordance with a further embodiment of the invention.

In the embodiment shown the camera system 10 includes a light transmitter 11 arranged to transmit modulated radiation at scene to be imaged.

The system includes a pattern application structure 12 operating between the transmitter and the target scene. The pattern application structure operates to apply structured light patterns to the modulated transmitter radiation. In the embodiment shown this component is formed by an engineered diffuser, although those skilled in the art will appreciate that other forms of components can be used.

An image sensor 13 is also provided with the camera system 10. This sensor is configured to measure radiation reflected from a target, and to supply output measurement information to a processor 14. The processor is programmed to resolve from the measurements received the direct source reflection radiation, the multi-path component radiation, and the relative contributions of direct and multi-path radiation.

Figure 7:
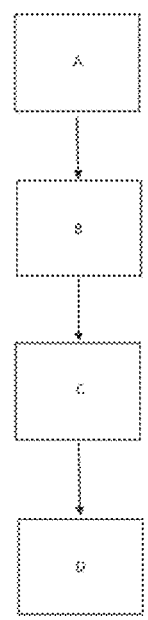
FIG. 7 shows a flow chart illustrating executable instructions arranged to implement a method of operating the time of flight camera system shown with respect to FIG. 6.

FIG. 7 shows a flow chart illustrating executable instructions arranged to implement a method of operating the time of flight camera system shown with respect to FIG. 6.

The first step A of the method implemented provides instructions which generate a modulated illumination signal to drive the operation of the camera system's light transmitter.

Next at step B instructions are provided which trigger the pattern application structure into applying a structured light pattern to the modulated light illumination signal. In this embodiment these instructions trigger the transmission of the modulated light from the light transmitter through a pattern application structure provided by an engineered diffusor.

At step C instructions are provided which enable the image sensor to capture a plurality of images of reflections of the modulated illumination signal for a plurality of pixels of the image sensor.

Lastly at step D a set of instructions are programmed into a processor of the camera system which calculate the contribution of direct source reflection radiation and the contribution of multi-path component radiation from the captured images at each of the plurality of pixels.

Those skilled in the art will appreciate that the invention may be implemented in a number of different ways in a variety of embodiments. For example, the invention may be implemented in various embodiments with one or more modulated light transmitters and one or more pattern application structures as shown with respect to FIGS. 8-12. In the embodiments illustrated the time of flight camera system provided uses a laser diode as a modulated light transmitter and an engineered diffuser as a pattern application structure. These configurations of the invention apply a sequence of structured light patterns over time, providing an efficient device with a small size and with relatively low power requirements.

In various embodiments multiple laser light transmitters and/or engineered diffuser sets can be used to generate the multiple projection patterns used, as illustrated with respect to FIGS. 8 through 12. As will be appreciated by those skilled in the art pattern alignment illustrated in FIGS. 8 through 12 is for illustration only, with implementations of the invention being capable of different and varied pattern structures and alignments.

Figure 8:
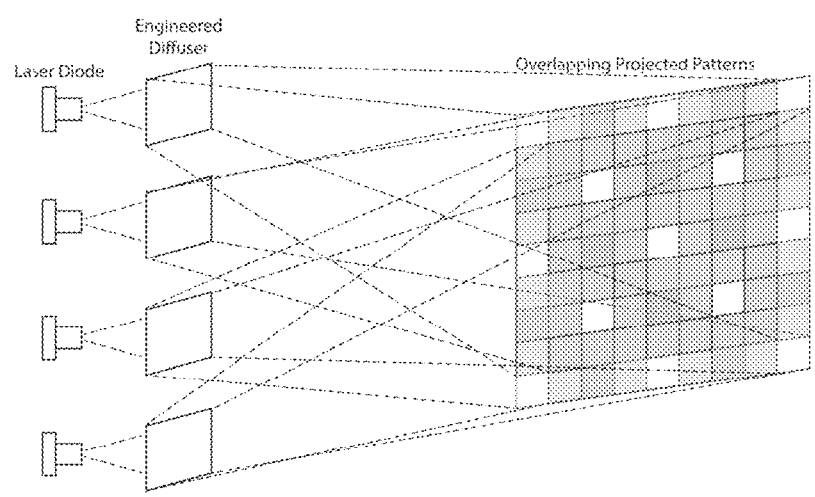
FIGS. 8 to 12 show further embodiments which employs multiple laser light transmitters and one or more engineered diffusers to generate the multiple structured light patterns simultaneously.
Figure 9:
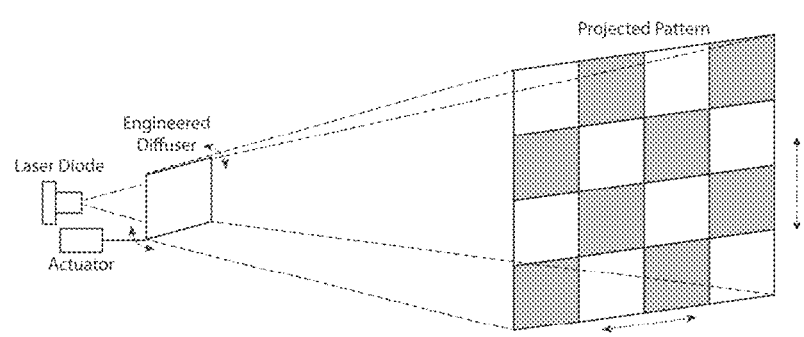
Figure 10:
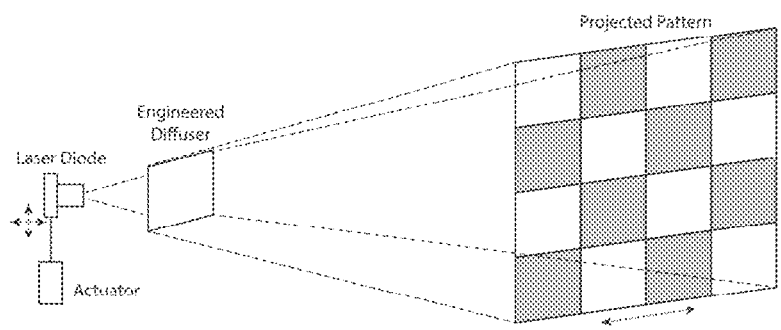
Figure 11:
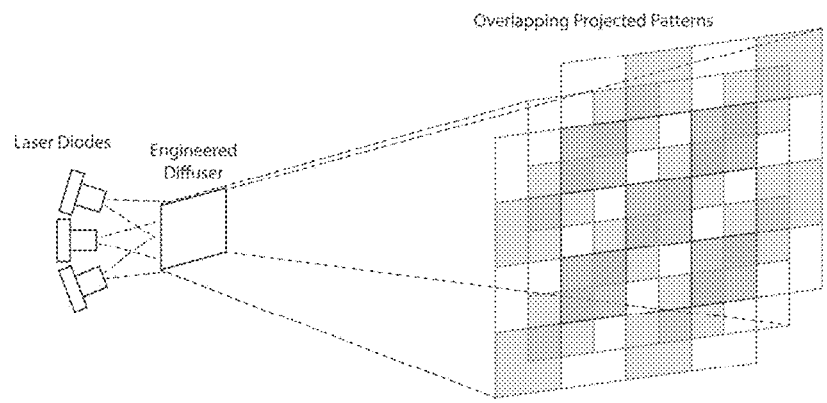
Figure 12:
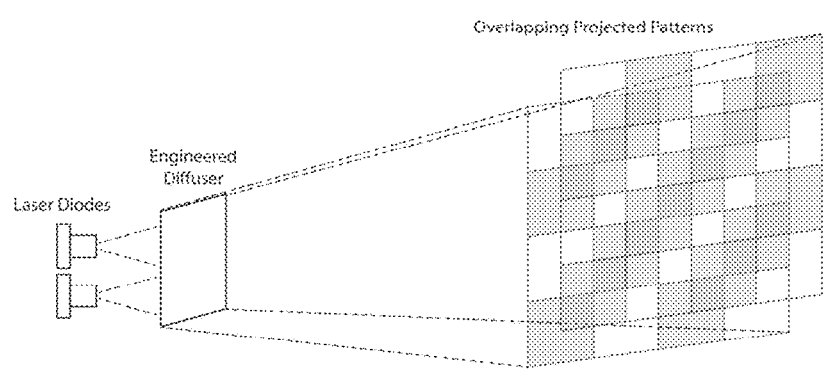

In particular;

FIG. 8 shows the use of multiple laser diodes, each combined with its own pattern applying engineered diffuser, FIG. 9 shows the use of a mechanical actuator with a single laser diode and engineered diffuser, the actuator being arranged to move the diffusor to change the pattern applied, FIG. 10 shows the use of a mechanical actuator with a single laser diode and engineered diffuser, the actuator being arranged to move the laser diode to change the pattern applied, FIGS. 11 and 12 shows the use of multiple laser diodes and a single engineered diffuser, each laser diode being orientated so as to produce one of the set of overlapping projected structured light patterns shown.

The modulation signal applied to each laser, and image capture process, can be encoded with a Walsh code, or other pseudo-random sequence, and some or all of the lasers can be operated simultaneously. More image captures are required, with each of the traditional captures subdivided into shorter captures, each with a phase according to the coding sequence.

Figure 13:
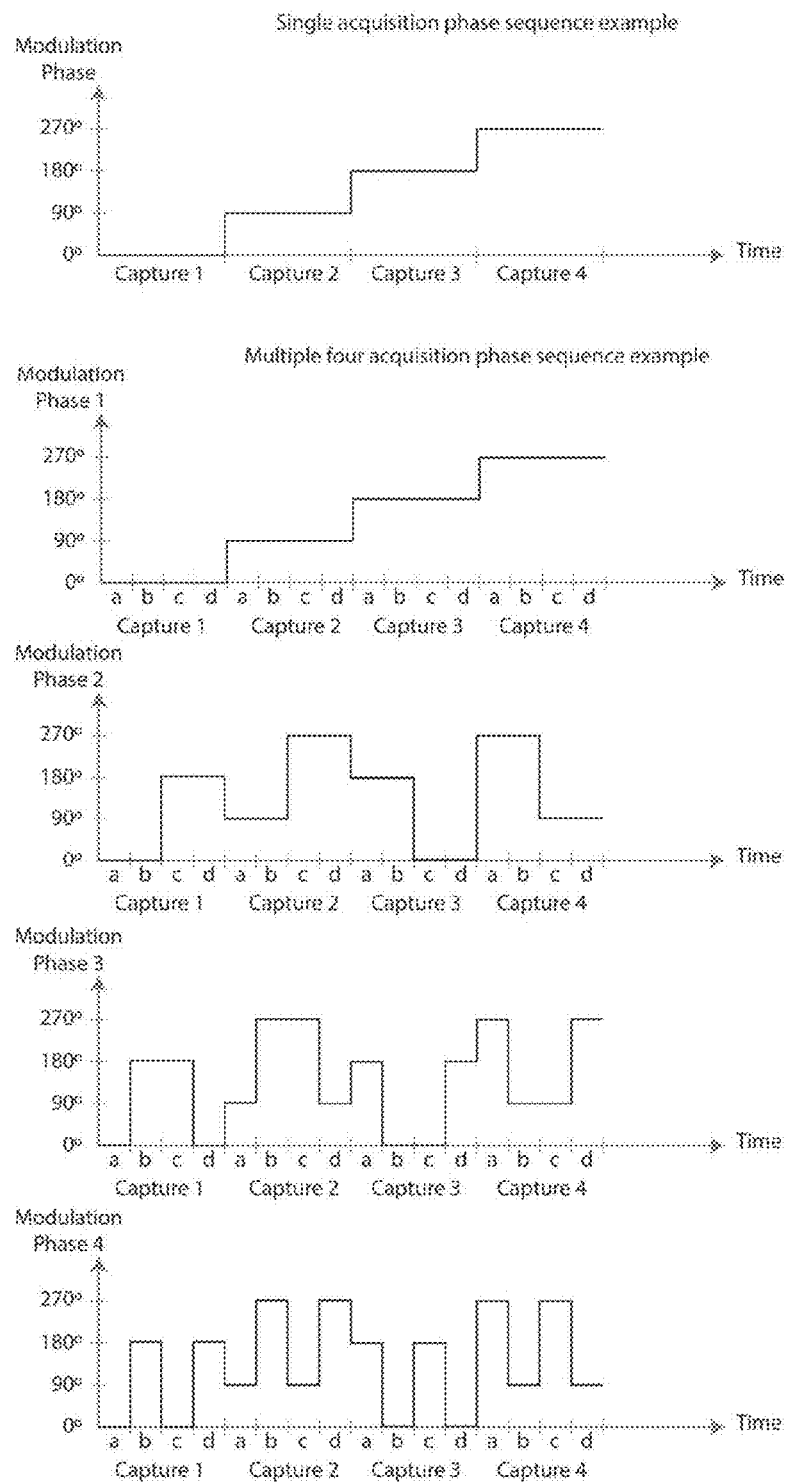
FIG. 13 shows a possible implementation of illumination modulation sequence for four structured light patterns projected simultaneously.

An example of a possible implementation of an illumination modulation sequence for four projected patterns is shown in FIG. 13, as compared to a traditional four-phase capture process. The imaged pattern for each transmitter can be decoded by applying the matching coding sequence to the collected image captures in post-processing. For each capture, the individual patterns can be calculated following the form:

$$\begin{bmatrix} \text{1st pattern} \\ \text{2nd pattern} \\ \text{3rd pattern} \\ \text{4th pattern} \end{bmatrix} = \begin{bmatrix} a & b & c & d \end{bmatrix} \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Figure 14:
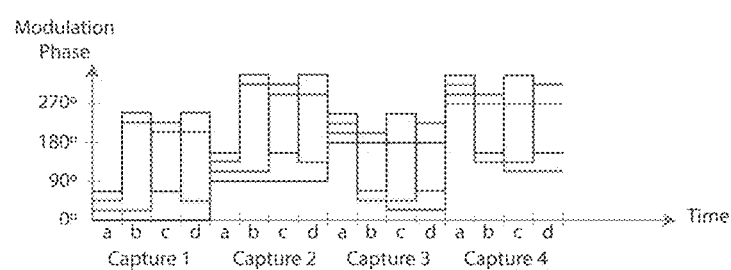
FIG. 14 shows the modulation coding approach of FIG. 13 with a phase offset applied to each coded illumination modulation.

FIG. 14 shows the modulation coding approach of FIG. 13 with an offset phase offset applied to each coded illumination modulation. This approach can improve signal levels in regions of overlapping patterns where modulation signals 180 degrees out of phase result in destructive interference and loss of modulated signal level.

The modulation and capture coding described with respect to FIGS. 13 and 14 can also be applied to homogeneous illumination with different frequency modulation signals to achieve simultaneous multiple frequency modulation acquisitions.

As will be appreciated by those skilled in the art, these structured light patterns can be used to resolve direct and global scattering, thereby separating direct and interfering multipath returns, removing accuracy errors caused by multi-path.

Structured light patterns can be used to resolve direct and global scattering, thereby separating surface and subsurface scattering returns, removing accuracy errors due to subsurface scattering, and revealing the subsurface scattering information. The subsurface scattering information is useful for selecting the nature, or local changes in the nature, of the internal scattering properties of objects. For example subsurface scattering information can be used to detect abnormalities in fruit or other produce, or could also be used in Diffuse Optical Tomography applications, such as internal medical imaging.

Structured light patterns can help the detection of motion blur, and can enhance algorithms for the correction of motion blur known in the art.

The coded modulation and capture process described in the implementations discussed above with respect to FIGS. 13 and 14 can be further randomised, or otherwise ordered, to minimise the motion artifacts, and further assist motion blur correction algorithms.

Figure 15:
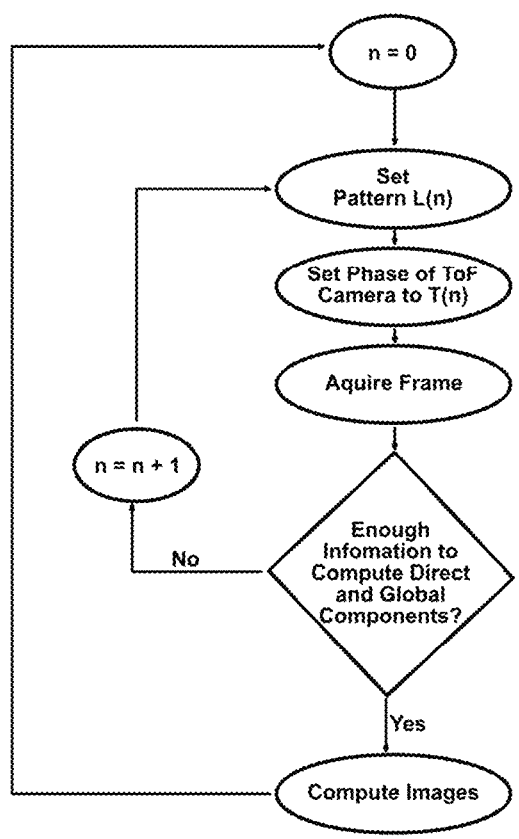
FIG. 15 shows an exemplarily flow chart illustrating executable instructions arranged to implement a method of resolving the direct path component or the multi-path component of modulated radiation reflected from a target by a time of flight camera system.

Those skilled in the art will also appreciate that the scope of the invention also extends to computer executable instructions stored on computer readable media or memory. FIG. 15 provides an exemplarily flow chart of the process of execution of such instructions in one embodiment.

For example, these instructions can be implemented in conjunction with the physical equipment illustrated with respect to FIG. 9 which is arranged to apply a light and dark checkerboard structured light pattern. The mechanical actuator shown is also arranged to move the engineered diffusor to present both an initial pattern, and the inverse of this initial pattern. The same actuator can then move the engineered diffusor again to apply a new modified pattern, and again the inverse of this modified pattern.

As shown with respect to FIG. 15 a counter variable n is initialized to a value of 0. The laser diode is activated in its starting position with the phase of its light radiation set to value T(0). Intensity measurements are then recorded to acquire a frame of pixel values for the target scene of interest.

As only one frame has been acquired at this point the value of n is then incremented and the new pattern L(1) is set up by the mechanical actuator. This next pattern is the inverse of the L(0) pattern with the dark squares of the chequerboard pattern replacing the position of the light squares and vice versa.

Next the laser diode is activated in its new position with the phase of its light set to value T(1). The phase value T(1) is that of T(0) with a 180 degree phase shift added.

A frame of pixel values is then acquired with this new inverted configuration of the initial selected pattern. In some applications these two frames may provide a sufficiently accurate calculation of the direct and multipath contributions.

It is envisioned that in various embodiments multiple sets of modified patterns and their inverse forms will also be applied. In such cases the counter value n will be implemented again and a new pattern L(2) will be presented by the mechanical actuator shifting the diffuser only by a fraction of the length and/or height of the square dimensions of the chequerboard pattern. This new translation will then present a modified pattern used to capture a further frame of measurements, and which can also be inverted again (to form pattern L(3) with phase T(3)) to capture its related inverted frame.

Those skilled in the art will also appreciate that in other embodiments different forms of radiation transmitters and pattern application structures can be arranged to simultaneously apply a pattern and the inverse of this pattern with phase shifted modulated radiation. In these embodiments a single image may capture the light reflected from a target illuminated by both an original pattern and its inverse form.

Once a sufficient number of frames have been captured to meet with the accuracy requirements of the system implemented, these frames can be used to compute images which identify the direct and multipath contributions for each pixel within a measurement frame. In the embodiment discussed this computation is completed by adding together each frame formed by an initial pattern with the frame generated by the inverse of the same pattern. The inverted form of the pattern combined with the 180 degree phase shifted radiation used to apply it results in the removal of the multipath contribution from the calculated summation value. Depending on the application in which the invention is employed the direct path contribution information from this sum can then be encoded into a computed image, and/or a further operation can be completed to remove the calculated directed component from the measures to isolate the multipath contribution present.

Figure 16:
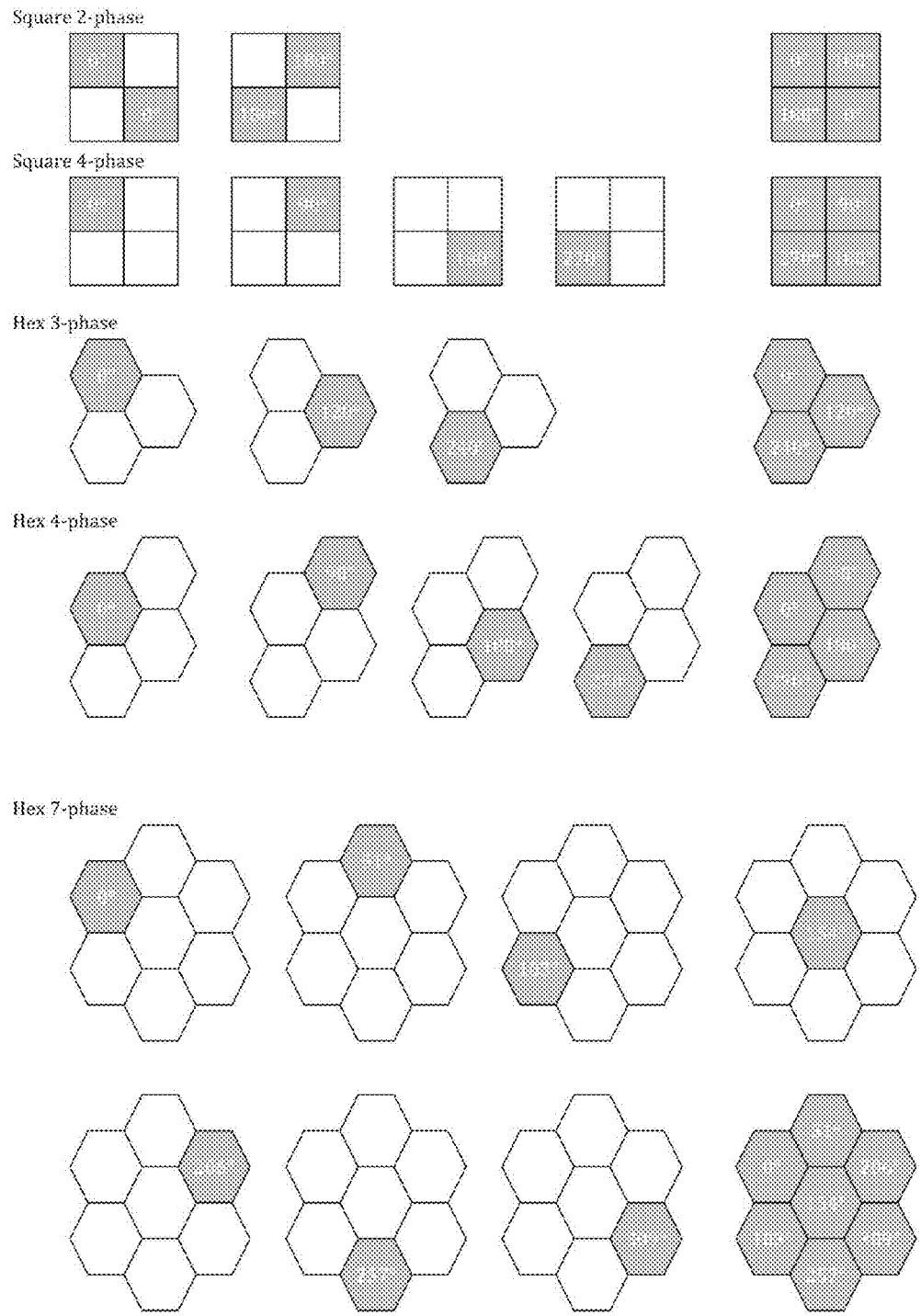
FIG. 16 illustrates a number of example sets of patterns and modulated radiation phase offsets used to apply each member pattern of the set as provided in accordance with a further embodiment of the invention.

FIG. 16 illustrates a number of example sets of patterns and the modulated radiation phase offsets used to apply each member pattern of the set in a further embodiment. The patterns of these sets each illuminate selected distinct areas only of a target scene, so that the net effect of the application of the set of patterns is to illuminate the entire target scene once only. The direct path contribution can be isolated for each selected distinct area by simple arithmetic operations to remove the multipath contributions common to the reflections from this area. The combined illumination coverage of each set is shown to right side of each set of patterns.

In embodiment illustrated as the square 2-phase pattern set the invention applies the initial left hand pattern, and also the right hand inverse of this initial pattern. The initial pattern is applied with modulated radiation with a 0 degree phase shift, and the inverse of the pattern is applied with the same form of modulated radiation which has been phase shifted by 180 degrees.

In the embodiment illustrated as the square 4-phase pattern, each pattern of the set illuminates one square only of a square checkerboard design. Each corner area is illuminated once only by one pattern, with each pattern being applied with successive 90 degree phase offset values.

Further variations in the numbers of phase offsets employed and the forms of the patterns applied are also illustrated by the Hex 3, 4 and 7 phase examples shown. Again each member pattern of the set illuminates a selected area only of the target of a time of flight camera, with the form of the pattern applied being dictated by the number of phase offsets used.

In the description and the following claims the word "comprise" or equivalent variations thereof is used in an inclusive sense to specify the presence of the stated feature or features. This term does not preclude the presence or addition of further features in various embodiments.

It is to be understood that the present invention is not limited to the embodiments described herein and further additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A time of flight camera system arranged to resolve a direct path component or a multi-path component of modulated radiation reflected from a target, the camera system comprising:
   a time of flight transmitter arranged to transmit modulated radiation at the target;
   at least one pattern application structure operating between the transmitter and the target, the pattern application structure operating to apply at least one structured light pattern to the modulated transmitter radiation; and
   an image sensor configured to measure radiation reflected from the target,
   the time of flight camera being arranged to resolve from the measurements received the contribution of direct source reflection radiation reflected from the target.

2. The time of flight camera system as claimed in claim 1, further comprising a processor arranged to receive the image sensor measurements and being programmed to resolve from the measurements received the direct source reflection radiation, the multi-path component radiation, and/or the relative contributions of direct and multi-path radiation.

3. The time of flight camera system as claimed in claim 1, wherein said at least one pattern application structure is arranged to apply a plurality of structured light patterns to the modulated transmitter radiation, said plurality of structured light patterns being generated using an initial pattern operated on by a similar type of waveform to that used to modulate the transmitter radiation.

4. The time of flight camera system as claimed in claim 3, wherein the waveform used to modulate the transmitter radiation and generate a structured light pattern are derived from the same basis function allowing the direct source reflection radiation and the multi-path component radiation to be decoded into orthogonal mathematical spaces.

5. The time of flight camera system as claimed in claim 4, wherein a sinusoidal basis function is used, and a sinusoidal or square waveform is used to modulate the transmitter radiation and generate a structured light pattern applied to the transmitter radiation.

6. The time of flight camera system as claimed in claim 1, wherein said at least one pattern application structure is arranged to apply an initial pattern and the inverse form of same initial pattern.

7. The time of flight camera system as claimed in claim 6, wherein the inverse form of same initial pattern is applied with modulated radiation which is phase shifted from the modulated radiation used to apply the initial pattern.

8. The time of flight camera system as claimed in claim 1, wherein said at least one pattern application structure is formed by at least one engineered diffuser.

9. The time of flight camera system as claimed in claim 1, wherein said at least one pattern application structure is formed by a micro-mirror array projector.

10. The time of flight camera system as claimed in claim 1, wherein the pattern application structure operates on the modulated transmitter radiation, resulting in at least a portion of a scene of interest being illuminated by radiation defining the structured light pattern where this radiation is also modulated by a source modulation frequency.

11. The time of flight camera system as claimed in claim 10, wherein the time of flight transmitter illuminates at least 50% of the scene containing the target.

12. The time of flight camera system as claimed in claim 11, wherein the time of flight transmitter illuminates all of the scene containing the target.

13. The time of flight camera system as claimed in claim 1, wherein the pattern applied exhibits spatial variation between component pixels making up the pattern.

14. The time of flight camera system as claimed in claimed in claim 1, wherein the pattern applied by the structure varies with time.

15. The time of flight camera system as claimed in claim 14, wherein a pattern application structure is configured to encode a pattern made up by a plurality of pixels where the value of the pattern encoded on at least one pixel varies to encode a different pattern over time.

16. The time of flight camera system as claimed in claim 15, wherein a single pixel is encoded with a pattern value which varies over time in accordance with the waveform derived from the same basis function as that used to modulate the transmitter illumination signal.

17. The time of flight camera system as claimed in claim 14, wherein an initial pattern is translated spatially and applied as a different pattern to the modulated radiation.

18. The time of flight camera system as claimed in claim 1, which includes two or more pattern application structures, each of which encodes one of a plurality of structured light patterns in the modulated illumination signal, the pattern applied by a pattern application structure using a different orthogonal coding to that used by another pattern application structure.

19. The time of flight camera system as claimed in claim 18, wherein the transmitted radiation has a different modulation frequency for each projected pattern.

20. The time of flight camera system as claimed in claim 18, wherein the transmitted radiation has a different modulation phase step sequence for each projected pattern.

21. The time of flight camera system as claimed in claim 18, wherein the transmitted radiation is encoded with a different pseudo-random sequence, Walsh-Hadamard code or equivalent, in time for each projected pattern.

22. A method of resolving the direct path component or the multi-path component of modulated radiation reflected from a target by a time of flight camera system, including the steps of:
  i. illuminating a target to be imaged with a modulated light beam which encodes a first structured light pattern;
  ii. capturing a first image of the illuminated target with an image capture device, the image captured defining a pixel surface made up from a plurality of pixels;
  iii. illuminating a target to be imaged with a plurality of modulated light beams which encode different structured light patterns;
  iv. capturing further images of the target illuminated by a series of different encodings of structured light patterns; and
  v. calculating the contribution of direct source reflection radiation or the contribution of multi-path component radiation.

23. The method of resolving the direct path component or the multi-path component of modulated radiation reflected from a target by a time of flight camera system as claimed in claim 22, wherein the target is illuminated at the same time with modulated light beams which encode different structured light patterns, each of said modulated light beams having a structured light pattern encoded with a different orthogonal coding.

24. The method of resolving the direct path component or the multi-path component of modulated radiation reflected from a target by a time of flight camera system as claimed in claim 22, wherein the target is illuminated at different times with modulated light beams which encode different structured light patterns.

25. The method of resolving the direct path component or the multi-path component of modulated radiation reflected from a target by a time of flight camera system as claimed in claim 22, wherein an image of the target is captured of the target illuminated with the inverse form of the first structured light pattern, the inverse form of first structured light pattern being applied with modulated radiation which is phase shifted from the modulated radiation used to apply the first structured light pattern.

26. The method of resolving the direct path component or the multi-path component of modulated radiation reflected from a target by a time of flight camera system as claimed in claim 25, wherein the contribution of direct source reflection radiation is calculated by adding the image values measured for an applied structured light pattern to the image values measured for the inverse form of the same applied structured light pattern.

27. The non-transitory computer-readable medium encoded with a computer program code for time of flight range imaging, the program code including instructions for:
  causing a modulated illumination signal to be emitted;
  causing at least one pattern application structure to apply a plurality of structured light patterns to the modulated illumination signal;
  causing an image sensor to capture a plurality of images of reflections of the modulated illumination signal for a plurality of pixels of the image sensor; and
  resolving the contribution of direct source reflection radiation or the contribution of multi-path component radiation from the captured images at each of the plurality of pixels.

28. The non-transitory computer-readable medium encoded with a computer program code as claimed in claim 27, wherein the code causes an image to be captured of the target illuminated by first structured light pattern and the inverse form of the first structured light pattern.

29. The non-transitory computer-readable medium encoded with a computer program code as claimed in claim 28, wherein the code causes the inverse form of first structured light pattern to be applied with a modulated illumination signal which is phase shifted from the modulated illumination signal used to apply the first structured light pattern.

30. A processor-readable medium having stored thereon processor-executable instructions which when executed by a processor perform a method as claimed in claim 22.

* * * * *